FALSE ERROR PREVENTION CIRCUIT

Filed June 23, 1960

INVENTOR.
ROBERT J. SCHREINER
BY
Samuel E. Turner

United States Patent Office 3,119,980 Patented Jan. 28, 1964

3,119,980

FALSE ERROR PREVENTION CIRCUIT

Robert J. Schreiner, Palo Alto, Calif., assignor to General Electric Company, a corporation of New York Filed June 23, 1960, Ser. No. 38,353
4 Claims. (Cl. 340—146.3)

This invention relates to a system for reading human language symbols printed on a document and in particular to a circuit for preventing an error detection apparatus of the system from producing erroneous error signals and for allowing the production of error signals only during predetermined intervals.

A United States Patent No. 2,924,812, issued February 9, 1960 to P. E. Merritt and C. M. Steele, for an Automatic Reading System which is assigned to the same assignee as the instant invention, describes and claims a system for automatically reading human language which is printed on documents as symbols in ink capable of being magnetized. The symbols are magnetized and translated in sequence past a transducer adapted to generate a distinctive electrical waveshape for each symbol. This symbol representing waveshape is applied to a wave transmission means in the form of a delay line which is provided with a plurality of spaced sampling taps for detecting the voltage at corresponding antinodes of the waveshape.

For recognition of the waveshape, a plurality of symbol recognition circuits or transmission channels, one for each of the waveshapes to be recognized, are each connected to the sampling taps through a respective waveshape correlation network. Additional circuitry interconnects the symbol recognition circuits for comparing the signals from the correlation networks and for producing a single output signal from the symbol recognition having the highest output from its correlation circuit. A timing circuit senses the entry of a waveshape into the delay line and produces a "sample signal" when the waveshape reaches a predetermined or "sampling" position. In this position each antinode of the waveshape is substantially in alignment with a predetermined respective one of the sampling taps of the delay line. The sampling signal is applied to a gated output circuit from the symbol recognition circuits and a symbol signal on a lead corresponding to the detected symbol is thereby produced.

Magnetic symbol bearing documents are not perfect and waveshapes departing from the ideal form may be reproduced therefrom. Such distorted waveshapes may be caused by, for example, extraneous magnetic ink particles acquired by the document during printing of the magnetic symbols or by magnetic wastes, such as iron particles, which become embedded in the document when it is manufactured. Thus waveshapes may be distorted to the extent that no one correlation network of the symbol recognition circuits produces an output signal amplitude significantly greater than one or more of the other correlation networks. Frequently the result is that output signals are erroneously produced by more than one of the symbol recognition circuits.

In a United States patent application Serial No. 783,350 entitled Spurious Signal Suppression in Automatic Symbol Reader, filed December 29, 1958 by P. E. Merritt and C. M. Steele and assigned to the instant assignee, there is disclosed a system for detecting erroneous multiple outputs and for thereupon producing an error signal. In the circuit therein disclosed, the output terminal of each of the symbol recognition circuits is applied to a respective input terminal of a summing network. The output of the summing network is applied to the input terminal of a threshold amplifier. In the event of a signal output from only one of the symbol recognition circuits the output of the summing network is insufficient to cause the threshold amplifier to conduct. On the other hand, signal outputs from two or more symbol recognition circuits cause the threshold amplifier to conduct and produce the error signal.

In the symbol reader circuit shown in the above mentioned patent application Serial No. 783,350 the symbol signals and the error signal are produced substantially simultaneously. However, this creates a problem because when an error signal is produced it is desirable that it be received by the utilization apparatus before the erroneous symbol signals. The error signal may then be used to initiate operation of rejection logic to thereby ignore or reject the faulty information.

Another problem is that under certain conditions erroneous error signals may be produced as follows. It will be appreciated that symbols are not always uniformly printed; for example, the thickness of the magnetic ink can vary from document to document. Also the density of the magnetic material in the ink can vary. For these and other reasons the signals obtained vary in amplitude from document to document. It is, of course, desirable to accommodate as wide a range of amplitude variation as is possible.

However, electronic circuits such as gates have a finite dynamic range. Within the dynamic range of the usual AND gate, for example, a signal at each of its two input terminals is required in order to produce an output signal. However, if the signal at one of the input terminals is of sufficient magnitude an output signal may be produced in the absence of a signal on the other input terminal. In a practical symbol recognition system it has been found that a very high amplitude symbol waveshape can cause not only a correct symbol signal from the corresponding symbol recognition circuit when the waveshape is in the sampling position but it can also subsequently feed through a disarmed gate and produce an erroneous symbol signal from another symbol recognition circuit when it has reached the position where its antinodes are again in alignment with the sampling taps of the delay line. The error circuit thus detects a multiple output and produces an error signal. This error signal is erroneous since the waveshape was properly identified when it was in the sampling position. It is thus desirable to limit the time during which output error signals can be produced to an error detection period which is somewhat less than the time required for the antinodes of the waveshape to travel from one sampling tap to the next.

It is therefore an object of this invention to provide an improved symbol reading system.

Another object is to provide an improved timing circuit in a symbol reading system.

Another object is to prevent erroneous error indicating signals.

Another object is to produce true output error signals prior to output symbol signals.

Another object is to precisely limit the period during which output error signals can be produced.

Another object is to temporarily store symbol signals during a period when true output error signals are allowed.

These and other objects of the invention are achieved in a symbol recognition system according to the above mentioned patent application Serial No. 783,350 by providing a plurality of temporary storage devices, each connected to a respective one of the gated outputs of the symbol recognition circuits, for temporarily storing symbol signals during the error detection period. At the end of the error detection period the storage devices are sensed by means of an output symbol signal gating arrangement for producing the output symbol signal. By this structure the error signal preceeds the symbol signals and operation of rejection apparatus of the utilization equipment (not shown) may be initiated thereby.

Erroneous error signals are prevented by providing a gating arrangement in the output circuit of the error detection circuit and an additional timing circuit is provided to establish the error detection period. This timing circuit produces a "read signal" at the end of the error detection period for interrogating the output symbol signal gates and for disarming the error detection circuit output gate.

The invention will now be more specifically described with reference to the accompanying drawings, wherein.

Figures 1, 2:
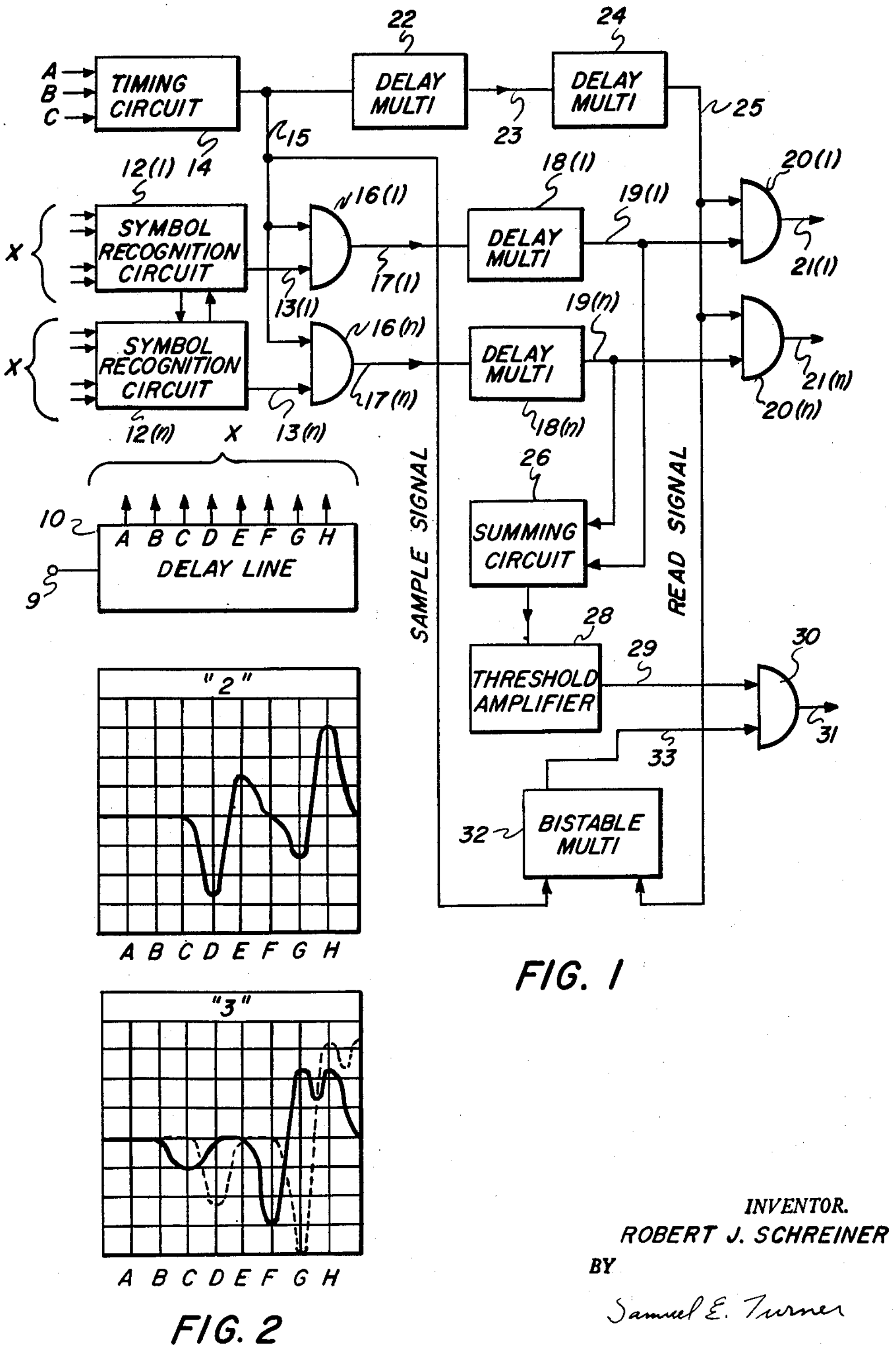
FIGURE 1 is a schematic diagram of an embodiment of the invention.
FIGURE 2 illustrates typical symbol waveshapes useful in explaining the operation of the embodiment of FIG. 1.

In FIG. 1 there is shown an illustrative embodiment of the invention. In the above mentioned U.S. patent application Serial No. 783,350, there is shown a complete symbol reading system to which reference is made for a full explanation of the structure and operation of the symbol recognition system. Only so much of the complete system as is necessary for a full and complete disclosure of the present invention is shown in FIG. 1.

Briefly, a complete symbol recognition system, as shown in the above mentioned patent application Serial No. 783,350, includes a magnetic reading transducer past which printed documents are moved. The symbols to be detected are printed on the document with an ink which contains magnetizable material. The symbols are printed with a particular type font such that when a magnetized symbol passes adjacent the reading transducer a distinctive waveshape corresponding to the symbol is produced by the reading transducer. This reading structure is not shown herein since it forms no part of the present invention.

The symbol waveshape, produced by the reading transducer is applied to an input terminal 9 of a wave transmission device shown in FIG. 1 as a delay line 10. The waveshape is propagated along the delay line. Delay line 10 is provided with a plurality of waveshape sampling taps A—H each corresponding to a possible positive or negative antinode of the permissible symbol waveshapes. See FIG. 2 which illustrates that the waveshape of the symbol "2," for example, has positive antinodes at sampling taps E and H and negative antinodes at sampling taps D and G when this waveshape is in the reference or sampling position in the delay line.

Each sampling tap A—H is connected to corresponding input terminals X of each of a plurality of symbol recognition circuits **12(1)–12(*n*)**. There is a separate symbol recognition circuit corresponding to each of the (*n*) symbol waveshapes to be recognized. Each of the symbol recognition circuits **12(1)–12(*n*) contains a distinctive correlation circuit related to the position and amplitude of the positive and negative antinodes of the corresponding symbol waveshape. Each of the correlation circuits produces a voltage when a waveshape is in the reference or sampling position in the delay line 10** but the correlation circuit in the symbol recognition circuit corresponding to the waveshape produces the highest voltage. A comparison circuit, formed of interconnected portions of the symbol recognition circuits, compares the voltage from the correlation circuits and produces a signal on the output lead of the symbol recognition circuit corresponding to the waveshape. For purposes of illustration, only two symbol recognition circuits are shown in FIG. 1. However, it is to be specifically understood that a separate symbol recognition circuit is provided for each symbol to be recognized.

In order to relate the operation of the system to the position of a waveshape in the delay line, a timing circuit 14 is provided. The input terminals of the timing circuit are connected to one or more of the sampling taps of the delay line and are shown in FIG. 1 as connected to sampling taps A, B and C. The timing circuit 14 detects the position of a waveshape in the delay line 10 and is arranged to provide a pulse designated a "sample signal" on a lead 15 when the waveshape reaches the reference or sampling position. Details of the structure and operation of the symbol recognition circuits **12(1)–12(*n*) and of the timing circuit 14** may be found in the above mentioned U.S. patent application Serial No. 783,350.

A description of the novel structure of the present invention now follows. The description will be directed first to the structure for temporarily storing the symbol signals, then to the timing structure for establishing the error detection period and finally to the error signal gating arrangement. For purposes of explanation it is convenient to consider certain elements of FIG. 1 as constituting a "symbol channel." These elements include one of the symbol recognition circuits **12(1)–12(*n*), a corresponding one of a plurality of channel AND gates 16(1)–16(*n*), a corresponding one of a plurality of channel delay multivibrators 18(1)–18(*n*) which constitute the storage devices for storing the symbol signal during the error detection period and a corresponding one of a plurality of symbol output AND gates 20(1)–20(*n*)**. These interconnected elements are operable to recognize a corresponding symbol waveshape and to ultimately produce an output symbol signal. There is, of course, one symbol channel for each of the symbols to be recognized.

As previously mentioned, when a waveshape is in the sampling position in the delay line, a sample signal is produced by the timing circuit 14. The sample signal is applied over the lead 15 to one of the input terminals of the channel gates **16(1)–16(*n*). Another input terminal of the gates 16(1)–16(*n*) is connected to a respective symbol recognition circuit output lead 13(1)–13(*n*). Assuming for purposes of explanation that the symbol recognition circuit 12(1) corresponds to the present waveshape in delay line 10, then as previously pointed out the symbol recognition circuit 12(1) will produce a signal on its output lead 13(1) when the waveshape is in the sampling position. Thus this signal and the sample signal are simultaneously applied to the respective input terminals of gate 16(1). Therefore the channel gate 16(1) produces a signal on its output lead 17(1). (Embodiments of suitable AND gating circuits are shown by Abraham I. Pressman in chapter 8, for example, of "Design of Transistorized Circuits for Digital Computers," John F. Rider Publisher, Inc., New York, 1959.) The lead 17(1) connects the output terminal of channel gate 16(1) to the input terminal of a symbol signal storage device illustrated in FIG. 1 as channel delay multivibrator 18(1)**. A delay multivibrator is a two-state circuit which is normally in its reset state and is responsive to a suitable input signal to assume its set state, which state it maintains for a predetermined design period and after which it automatically returns to its reset state. (A suitable embodiment of such a multivibrator is shown in FIG. 11–15 of the above-mentioned publication by Abraham I. Pressman.)

The signal from the gate 16(1) is effective over lead 17(1) to cause the channel delay multivibrator 18(1) to assume its set state. In its set state the channel delay multivibrator produces a relatively high voltage on an output lead 19(1). As previously mentioned, the purpose of the delay multivibrator is to effect a temporary storage of the symbol signal so that an error circuit, hereinafter described, can detect for possible errors before the symbol signal is produced by gate 20(1) and sent to the utilization circuit (not shown).

It is theoretically possible to provide channel delay multivibrators **18(1)–18(*n*) of such precision and identity of period that these multivibrators alone could be used to determine the error detection period. However, precision delay multivibrators are difficult and costly to make and because a plurality of channel delay multivibrators are required it is a practical advantage to provide separate storage and error detection period timing structures. Thus a pair of cascaded delay multivibrators 22 and 24 are provided for determining the error detection period. Delay multivibrator 22 assumes its set state in response to the sample signal on lead 15. When multivibrator 22 reverts to its reset state it produces a pulse over a lead 23 which triggers the delay multivibrator 24. The period of multivibrator 24 is relatively short and its purpose is to produce a pulse, designated a "read signal," on a lead 25. The read signal is applied over lead 25 to one of the input terminals of the symbol output gates 20(1)–20(*n*). Thus if the channel delay multivibrator 18(1), for example, is in its set state the consequent relatively high potential on lead 19(1) arms the associated gate 20(1) and when the read signal occurs, the gate 20(1) produces an output symbol signal on a symbol output lead 21(1). By the provision of the separate timing structure just described the precision requirements of the channel delay multivibrators 18(1)–18(*n*)** are greatly reduced and it is only necessary that the minimum period of the channel delay multivibrators exceed the error detection period, that is, the period between the sample signal and the read signal.

An error circuit is provided which, as herein-before mentioned, detects the improper occurrence of symbol signals in more than one of the symbol channels. This error detection structure includes a summing circuit 26 having its output terminal connected to the input terminal of a threshold amplifier 28. The summing circuit has a respective input connection to each of the output leads **19(1)–19(*n*) of each of the channel delay multivibrators 18(1)–18(*n*). Thus the summing circuit 26 acts to apply to the input terminal of threshold amplifier 28 a voltage which is proportional to the sum of the voltages at the outputs of delay multivibrators 18(1)–18(*n*). (A summing circuit is shown by G.A. Korn in "Electronic Analog Computers," p. 11, McGraw-Hill Book Co., Inc., New York, 1952.) In the absence of multiple signals in the symbol channels only one of the delay multivibrators is in its set (high output voltage) state during the error detection period. The voltage applied to the input of the amplifier 28 by the summing circuit 26 in response to a single high voltage input is insufficient to cause amplifier 28 to conduct. Therefore it produces no output. However, the voltage applied to the amplifier 28 by the summing circuit 26 in response to two or more high voltage inputs does cause the threshold amplifier to conduct and to produce a signal on a lead 29. (Threshold amplifier 28** may be any one of many well-known amplifiers merely suitably biased beyond cut-off to set the threshold level.)

In an ideal system the signal on lead 29 could constitute the error signal. However, in practical embodiments of symbol reading systems such as herein described the various factors thereof depart from ideal. For example, as hereinbefore mentioned, the amplitude of waveshapes entered into the delay line 10 can vary for the reasons previously set forth. Under certain conditions, an example of which is set forth hereinafter, a voltage can be produced on one of the symbol recognition circuit output leads **13(1)–13(*n*) after the error detection period that is of sufficient magnitude to exceed the dynamic limits of the corresponding one of the gates 16(1)–16(*n*) and cause a signal feed through which sets the associated one of the delay multivibrators 18(1)–18(*n*)** even though the sample signal is not present on the other input terminal of the gate.

It will be recalled that by providing the precision delay multivibrator 22 for determining the error detection period, relatively low precision multivibrators can be used for the channel delay multivibrators **18(1)–18(*n*). It is merely required that the minimum period of multivibrators 18(1)–18(*n*) be equal to or greater than the error detection period. Thus, in general, the periods of multivibrators 18(1)–18(*n*) overlap the error detection period. In other words, multivibrators 18(1)–18(*n*) reset at some non-precision time after the occurrence of the read signal. If a high amplitude signal feeds through one of the gates 16(1)–16(*n*) and sets the associated channel delay multivibrator, as described above, after the occurrence of the signal but before the channel delay multivibrator of the channel corresponding to the symbol waveshape being detected has reset, then the error circuit will sense that more than one of the channel delay multivibrators 18(1)–18(*n*) are in the set state and produce a signal indicative thereof on lead 29. Since the correct output symbol signal has been obtained on one of the leads 21(1)–21(*n*) at the occurrence of the read signal, if the signal on lead 29** were employed as the error signal, an erroneous error signal would be obtained under these conditions.

This problem of erroneous error signals is more readily understood by reference to FIG. 2 which illustrates, by the solid lines, examples of normal waveshapes of the symbols "2" and "3" in the reference or sampling position, that is, in the position when the sample signal occurs. The waveshape of the symbol "3" in the sampling position has positive antinodes at the G and H sampling taps and negative antinodes at the C and F sampling taps. The waveshape formed by the dashed line in FIG. 2 is an illustration of a high amplitude waveshape of a symbol "3" and it is shown in the position it occupies in the delay line at a time later than the sampling position corresponding to the distance between the sampling taps. In a practical embodiment of the invention, the time for an antinode of a waveshape to travel from one sampling tap to the next is in the order of 90 microseconds. Thus the high amplitude "3" waveshape is at the position illustrated 90 microseconds after the occurrence of the sample signal. It may be observed that in this position the high amplitude "3" waveshape has a positive antinode at sampling tap H and negative antinodes at sampling taps D and G. Note that the "2" waveshape in the sampling position has positive antinodes at sampling taps E and H and negative antinodes at sampling taps D and G. Thus it is clear that when the high amplitude "3" waveshape is one sampling tap past the sampling position it has three antinodes which correspond to three of the four antinodes of the "2" waveshape. For this reason it is evident that a high amplitude "3" waveshape can produce a high voltage output, on the one of the lead **13(1)–13(*n*) (FIG. 1) from the "3" symbol recognition circuit 90 microseconds later than the sample signal. As hereinbefore mentioned, if this voltage is sufficiently high the dynamic limit of the corresponding one of the gates 16(1)–16(*n*) is exceeded. Thus a signal is produced on the corresponding one of the leads 17(1)–17(*n*) which sets the channel delay multivibrator of the "2" channel even though the sample signal is not present at the input terminals of the gates 16(1)–16(*n*). The channel delay multivibrator in the "3" channel will have been set about 90 microseconds earlier at the occurrence of the sample signal and, if this multivibrator has not reset, the error circuit will now detect that two of the channel delay multivibrators are in the set state. Consequently a signal is produced on lead 29 from the threshold amplifier 28**. If this signal were employed as the error signal, such an error signal would be erroneous under the circumstances since the "3" waveshape has been correctly recognized during the error detection period.

Before describing the structure provided to prevent erroneous error signals it is pointed out that if the error detection period, that is, the period between the sample signal and the read signal, were in the order of the time required for an antinode of a waveshape to travel between sample taps (90 microseconds) two or more of the delay multivibrators 18(1)–18(n) could be set, as described above, before the occurrence of the read signal. This would produce multiple outputs on the symbol output leads 21(1)–21n. This is prevented by arranging that the error detection period is substantially less than 90 microseconds. In a practical embodiment the error detection period is about 45 microseconds as determined by delay multivibrator 22. Thus, as may be seen by inspection of FIG. 2, the waveshape travels no more than half way between sampling taps during the error detection period. Therefore the correct output symbol signal is produced on the corresponding one of the leads 21(1)–21(n) and the read signal is terminated before a waveshape comes into a position to cause the erroneous setting of another one of the delay multivibrators 18(1)–18(n).

Reverting now to the problem of preventing erroneous error signals as may occur, as explained hereinbefore, after the termination of the read signal, these are prevented by providing a gating circuit that limits the time during which error output signals are allowed to the error detection period. This gating circuit comprises an AND gate 30 an input terminal of which is connected to the output terminal of the threshold amplifier 28 by the lead 29. A bistable multivibrator 32 is provided to control the gate 30. A bistable multivibrator is a circuit which assumes a stable set or reset state in response to a pulse on a respective set or reset input. When in its reset state the bistable multivibrator provides a relatively high voltage on a reset output. (An embodiment of a suitable circuit for bistable multivibrator 32 may be found in chapter 11 of the above mentioned publication by Abraham I. Pressman.)

The reset output of bistable multivibrator 32 is connected by a lead 33 to the gate 30. Thus, when bistable multivibrator 32 is in its reset state, the gate 30 is armed and a signal from threshold amplifier 28 causes the gate 30 to produce an output error signal on a lead 31. The reset input of bistable multivibrator 32 is connected to the lead 15. Thus the sample signal resets bistable multivibrator 32 and the gate 30 is thereby armed. The set input of bistable multivibrator 32 is connected to lead 25. Thus the read signal sets bistable multivibrator 32 and the gate 30 is thereby disarmed. Therefore, by the provision of this gated error signal output, output error signals are generated by gate 30 only during the error detection period and erroneous error signals, which could otherwise be produced as hereinbefore described, are prevented.

While the principles of the invention have been made clear in the illustrative embodiments, there will be obvious to those skilled in the art, many modifications in structure, arrangement, proportions, the elements, materials, and components, used in the practice of the invention, and otherwise, which are particularly adapted for specific environments and operating requirements, without departing from those principles. The appended claims are therefore intended to cover and embrace any such modifications within the limits only of the true spirit and scope of the invention.

What is claimed is:

1. In a symbol recognition system, the combination of: a plurality of symbol recognition circuits for receiving symbol signals and each said circuits corresponding to one of the symbols to be recognized, each recognition circuit being operable to provide a signal upon receipt of corresponding symbol signals; a plurality of first gates connected to respective output terminals of said symbol recognition circuits; a first timing means for producing a sample signal in timed relation to the receipt of symbol signals by said symbol recognition circuits; means for applying said sample signal to said first gates for producing an output from the gate connected to the symbol recognition circuit providing said signal; a plurality of temporary storage devices connected to respective output terminals of said first gates and each adapted to be set to its storage state upon receipt of a signal from the associated first gate and for providing an output signal indicative of its set state; a plurality of second gates connected to respective output terminals of said storage devices; a second timing means operable in response to said sample signal to produce a read signal after a predetermined time interval; means for applying said read signal to said second gates for producing an output signal from each gate connected to a set storage device; and an error detection circuit including a signal summing circuit having a plurality of input terminals connected to respective output terminals of said storage devices, a threshold circuit having an input terminal connected to an output terminal of said summing circuit and operable to produce an output signal in response to a signal from said summing circuit above a predetermined amplitude, an error signal gate connected to an output terminal of said threshold circuit, a bistable circuit having set and reset input terminals and operable in its reset state to arm said error signal gate, means for applying said sample signal to the reset input terminal of said bistable circuit, and means for applying said read signal to the set input terminal of said bistable circuit for limiting the interval during which error output signals can be produced.

2. In a symbol recognition apparatus having a plurality of output lines each corresponding to one of the symbols to be recognized and including an error circuit for producing a signal upon detecting the presence of a symbol signal on more than one of said lines, means for preventing erroneous error signals by limiting the interval during which an output error signal is produced comprising: a first timing circuit for producing a sample signal in a predetermined timed relation to the reading of a symbol by said apparatus; a plurality of first gates connected in said output lines each conjointly responsive to said sample signal and to a symbol signal on the connected line to produce an output signal; a plurality of symbol signal storage devices connected to said first gates and each adapted to assume a signal storage state in response to receipt of a signal from the connected gate; a second timing circuit responsive to said sample signal to produce a read signal after a predetermined time interval; a plurality of second gates each connected to a respective one of said storage devices and each conjointly responsive to said read signal and to the symbol signal storage state of the connected device to produce a symbol representing output signal; an error detection circuit having a connection to each of said symbol signal storage devices, said detection circuit operable to produce an output signal when more than one of said devices is in the storage state; an error signal output gate connected to an output terminal of said error detection circuit; means responsive to said sample signal for arming said error signal output gate; and means responsive to said read signal for disarming said error signal output gate.

3. In a symbol recognition system, the combination of: a plurality of symbol channels for receiving symbol signals and each channel corresponding to one of the symbols to be recognized, each channel being operable to produce an output symbol signal upon receipt of corresponding input symbol signals; means for producing a sample signal in timed relation to the receipt of symbol signals by said channels; a normally disabled error circuit connected to said channels and operable when enabled to produce an error signal in response to symbol signals from more than one of said channels; means for producing a read signal a predetermined time later than the occurrence of said sample signal; means responsive to said sample signal to enable said error circuit; and means responsive to said read signal for disabling said error circuit for restricting the production of error signals to the time interval between said sample and read signals.

4. In apparatus for identifying each of a plurality of different input signals, said apparatus having an output lead for each of the signals to be identified and means for producing an output signal on the output lead corresponding to the input signal, the combination of: normally disabled detection means for detecting the simultaneous presence of signals on more than one of said output leads; means for enabling said detection means; means for disabling said detection means at a predetermined later time; and means for storing said signals while said detection means is enabled.

References Cited in the file of this patent

UNITED STATES PATENTS

| | | |
|---|---|---|
| 2,844,721 | Minkow | July 22, 1958 |
| 2,919,425 | Ress et al. | Dec. 29, 1959 |
| 2,927,303 | Elbinger | Mar. 1, 1960 |
| 2,958,072 | Batley | Oct. 25, 1960 |

UNITED STATES PATENT OFFICE
CERTIFICATE OF CORRECTION

Patent No. 3,119,980 — January 28, 1964

Robert J. Schreiner

It is hereby certified that error appears in the above numbered patent requiring correction and that the said Letters Patent should read as corrected below.

Column 6, line 22, after "the", second occurrence, insert -- read --; column 7, line 15, for "21(1)-21n." read -- 21(1)-21(n). --; column 10, after line 11, insert the following:

| | | |
|---|---|---|
| 2,939,124 | Saxenmeyer | May 31, 1960 |
| 2,961,649 | Eldredge et al. | Nov. 22, 1960 |

same column 10, after line 12, insert the following:

| | | |
|---|---|---|
| 3,031,646 | Reinholtz | Apr. 24, 1962 |
| 3,071,723 | Gabor | Jan. 1, 1963 |

Signed and sealed this 18th day of August 1964.

(SEAL)
Attest:

ERNEST W. SWIDER
Attesting Officer

EDWARD J. BRENNER
Commissioner of Patents